(12) United States Patent
Mori et al.

(10) Patent No.: US 6,575,261 B2
(45) Date of Patent: Jun. 10, 2003

(54) DRIVE-FORCE DISTRIBUTION CONTROLLER

(75) Inventors: Yutaka Mori, Toyohashi (JP); Yoshio Takahashi, Chiryu (JP); Yusaku Ido, Chiryu (JP); Ryohei Shigeta, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/794,070

(22) Filed: Feb. 28, 2001

(65) Prior Publication Data

US 2002/0003057 A1 Jan. 10, 2002

(30) Foreign Application Priority Data

Feb. 28, 2000 (JP) ........................................ 2000-051251

(51) Int. Cl.[7] ............................................. B60K 17/344
(52) U.S. Cl. ........................... 180/248; 180/197; 701/89
(58) Field of Search ................................ 180/248, 249, 180/197; 701/89

(56) References Cited

U.S. PATENT DOCUMENTS

| | | | | |
|---|---|---|---|---|
| 4,921,065 A | * | 5/1990 | Hamada et al. ............. | 180/245 |
| 4,966,250 A | * | 10/1990 | Imaseki ....................... | 180/248 |
| 5,497,333 A | * | 3/1996 | Sasaki ......................... | 180/197 |
| 5,701,247 A | * | 12/1997 | Sasaki ......................... | 180/248 |
| 5,850,616 A | * | 12/1998 | Matsuno et al. ............. | 180/197 |
| 5,894,904 A | * | 4/1999 | Yakou et al. ................ | 180/247 |
| 6,145,614 A | * | 11/2000 | Kimura et al. .............. | 180/248 |
| 6,205,391 B1 | * | 3/2001 | Ghoneim et al. ........... | 180/167 |

FOREIGN PATENT DOCUMENTS

| | | |
|---|---|---|
| JP | 8-2278 | 1/1996 |
| JP | 11-1129 | 1/1999 |

* cited by examiner

*Primary Examiner*—Daniel G. DePumpo
(74) *Attorney, Agent, or Firm*—Oblon, Spivak, McClelland, Maier & Neustadt, P.C.

(57) ABSTRACT

A drive-force distribution controller for a four-wheel-drive vehicle having a torque distribution unit configured to distribute an output torque transmitted from a prime motor to a first set of wheels to a second set of wheels. The drive-force distribution controller includes a first judging device for judging which of the first set is an inner wheel with respect to a turning of the vehicle, a second judging device for judging whether the turning of the vehicle is a tight turn, a third judging device for judging whether the inner wheel is slipping, a fourth judging device for judging whether an outer wheel of the first set of wheels is slipping, and a controlling device for controlling the torque distribution unit.

16 Claims, 8 Drawing Sheets

DRIVE-FORCE DISTRIBUTION CONTROLLER

BACKGROUND OF THE INVENTION

1. Field of the Invention

The present invention relates to a drive-force distribution controller and a control method for a four-wheel-drive vehicle, and more particularly to a drive-force distribution controller and a control method for a four-wheel-drive vehicle in order to avoid a tight-corner braking phenomenon and a slip state when the vehicle turns.

2. Description of the Related Art

In a four-wheel-drive vehicle, it is known that a braking application acts on front and rear wheels due to a difference of a traveling distance therebetween when the vehicle travels on a corner whose radius is small in a case that a differential between front and rear wheel is restricted, i.e., a tight-corner braking phenomenon happens, whereby it cause to deteriorate a steering feeling in general.

To avoid this tight-corner braking phenomenon, that described in Japanese Patent Publication (Kokai) No. 8-2278 has been proposed, for example. In this related art, a differential speed between an outer front wheel and an inner rear wheel is calculated when the vehicle travels on the corner. In a case that the calculated differential speed is larger than a preset differential speed in a turning radius where the tight-corner braking phenomenon happens, it is judged that the tight-corner braking phenomenon happens, the differential between the front and rear wheel can be accepted by decreasing an engagement force in a differential restricting clutch of a torque distribution unit.

However, in the aforementioned art, when any one of the driving wheels travels on a low $\mu$ road, e.g., when any one of the driving wheel works in a rut in which water ponds, that wheel may slip. In such a situation, the tight-corner braking phenomenon is detected accidentally, so that the differential between the front and rear wheels may be accepted momentarily.

Further, in a case that the vehicle launches from the low $\mu$ road, e.g., a deep-snow road or a dirt road, it is generated frequently that any one of the driving wheels slips. In the front-wheel drive base four-wheel drive vehicle, one of the front wheels facilitates to slip to give a large drive force to the front wheels, for example. In this case, the tight-corner braking phenomenon is detected accidentally in the aforementioned art, so that the differential between the front and rear wheels may be accepted momentarily. Thus, in a case the differential between the front and rear wheel is accepted momentarily, a required drive force is not obtained substantially. As a result it may be generated that the vehicle gets free from the rut when traveling on the low $\mu$ road, or that the vehicle threatens to launch smoothly when launching on the low $\mu$ road.

Furthermore, the controller described in Japanese Patent Publication (Kokai) No. 11-1129 is proposed to prevent the tight-corner braking phenomenon when turning at an extremely low speed and to slip. In that controller, a wheel speed difference between the front and rear wheel is calculated based upon a wheel speed of each of the four wheels, an operated steering angle and yaw rate, and the engagement force in the differential restricting clutch of the torque distribution unit is based upon that wheel speed difference. Consequently, the tight-corner braking phenomenon is prevented when the vehicle turns at the extremely low speed, and the slipping is also prevented. In the aforementioned controller, a yaw rate sensor is however required, so that the control operation becomes complex.

Further, the aforementioned controller is of the type for controlling the wheel speed difference between the front and rear wheels, in a case that one of the driving wheels slips, the slipping may not be detected. In such a situation, the required drive force is not obtained substantially, so that it may be generated that the vehicle gets free from the rut when traveling on the low $\mu$ road, or that the vehicle threatens to launch smoothly when launching on the low $\mu$ road.

To solve the aforementioned problem, an object of the present invention is to provides a torque distribution controller of a four-wheel drive vehicle which is capable of preventing a generation of a tight-corner braking phenomenon and preventing slipping in one of the driving wheels infallibly.

SUMMARY OF THE INVENTION

According to one aspect of the present invention, a drive-force distribution controller for a four-wheel-drive vehicle having a torque distribution unit configured to distribute an output torque transmitted from a prime motor to a first set of wheels to a second set of wheels includes a first judging device for judging which of the first set of wheels is an inner wheel with respect to a turning of the four-wheel-drive vehicle, a second judging device for judging whether the turning of the four-wheel-drive vehicle is a tight turn, a third judging device for judging whether the inner wheel is slipping, a fourth judging device for judging whether an outer wheel of the first set of wheels is slipping, and a controller for controlling the torque distribution unit. The second judging device judges that the four-wheel-drive vehicle is engaged in a tight turn if the turning has a turning radius smaller than a predetermined value. The controller decreases the output torque to the second set of wheels if the second judging device judges that the four-wheel-drive vehicle is engaged in a tight turn and if the third and fourth judging devices judge that the first set of wheels are not slipping.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

Figure 1:
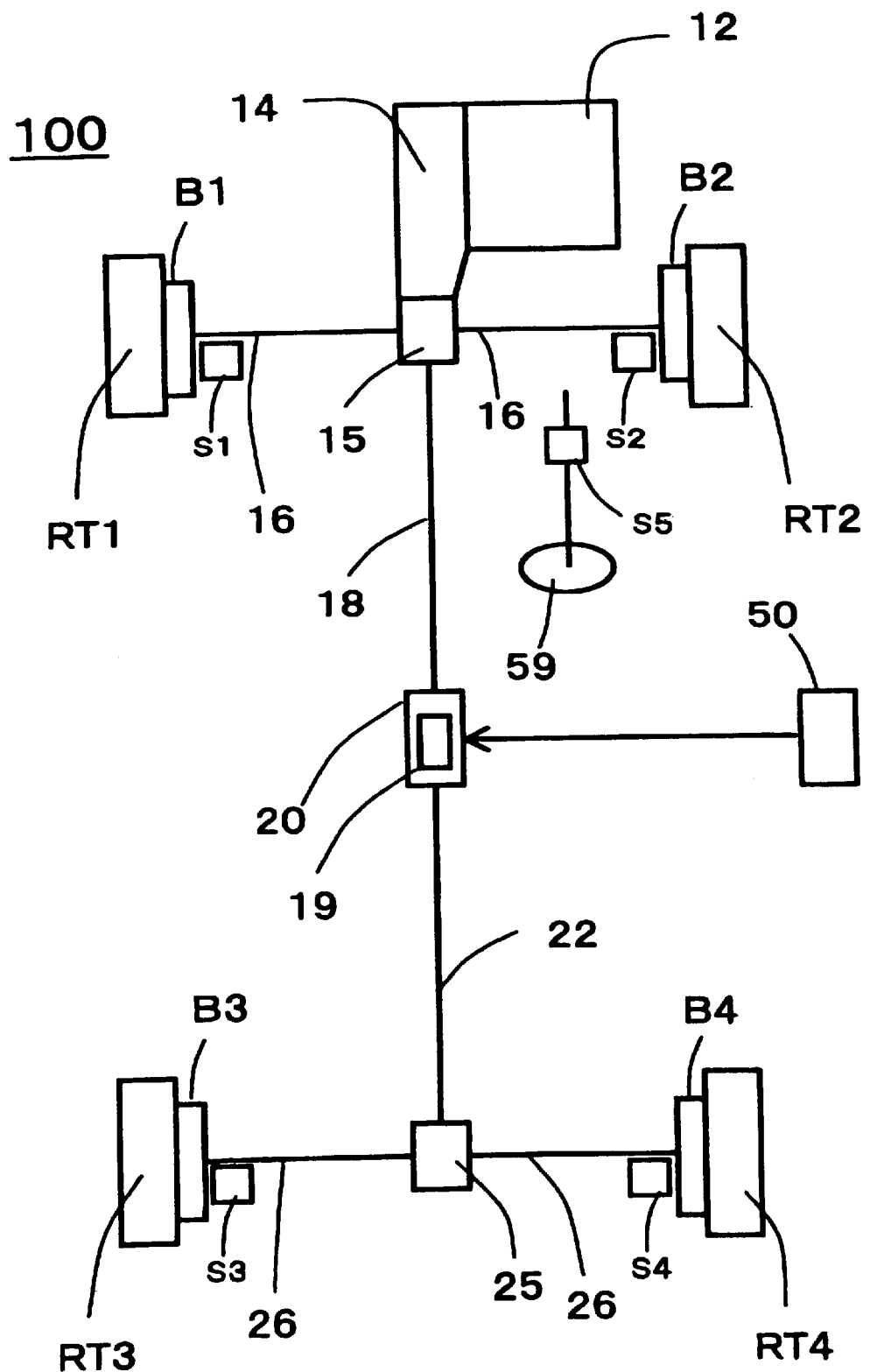
FIG. 1 is a diagram schematically showing the structure of a four-wheel-drive vehicle which is provided with a drive-force distribution controller according to first and second embodiments of the present invention.

FIG. 1 is a diagram schematically showing the structure of a four-wheel-drive vehicle which is provided with a torque distribution unit according to first and second embodiments of the present invention. In the first and second embodiments, a description will be given while a four-wheel-drive vehicle which is designed on the basis of front-wheel-drive.

[First Embodiment]

A trans axle 14 is of unitedly providing a transmission, a transfer and a front differential 15, in which a drive force (drive power) generated by an engine 12 is transmitted through the front differential 15 of the trans axle 14 to axle shafts 16 to drive left and right front wheels $RT_1$ and $RT_2$, and further transmitted to a first propeller shaft 18. The first propeller shaft 18 is connected with a second propeller shaft 22 through a torque distribution unit 20 (a coupling). When the first propeller shaft 18 is torque-transmittably connected with the second propeller shaft 22 by the torque distribution unit 20, the drive force can be transmitted through a rear differential 25 to axle shafts 26 to drive left and right rear wheels $RT_3$ and $RT_4$.

The torque distribution unit 20 is of being disposed between the first and second propeller shafts 18 and 22, and is composed of clutch plates 19 for transmitting a torque from the first propeller shaft 18 to the second propeller shaft 22, and a pressing mechanism (not illustrated) for engageably pressing the clutch plates 19. When a command signal from an electrical control circuit 50 is given to the pressing mechanism, a pressing force corresponding to the command signal acts on the clutch plates 19. In a case that it is so controlled to increase a torque distribution from the first propeller shaft 18 to the second propeller shaft 22 according to the command signal, the clutch plates 19 are directly connected to each other thereby, so that the torque of the first propeller shaft 18 can be directly transmitted to the second propeller shaft 22, for example. In contrast, when it is so controlled to restrict the torque distribution from the first propeller shaft 18 to the second propeller shaft 22, the command signal to the pressing mechanism is also restricted, so that the pressing force by the pressing mechanism does not act on the clutch plates 19. Therefore, the clutch plates 19 are separated from each other, so that the torque from the first propeller shaft 18 is not transmitted to the second propeller shaft 22. Thus, it is so constructed that the transmissible torque supplied from the first propeller shaft 18 to the second propeller shaft 22 can be adjusted by changing an engagement force of the clutch plates 19 in correspondence with a magnitude of the command signal.

On the driving (front) wheels $RT_1$ and $RT_2$ (hereinafter, the "driving wheels" mean primary recipients of the drive force from the engine 12) and the driven (rear) wheels $RT_3$ and $RT_4$ (hereinafter, the "driven wheels" mean secondary recipients of the drive force from the engine 12 via the torque distribution unit 20), there are respectively provided brakes $B_1$, $B_2$, $B_3$ and $B_4$, and wheel speed sensors $S_1$, $S_2$, $S_3$ and $S_4$ for detecting a wheel speed (angular velocity). Besides, each of the speed sensors $S_1$, $S_2$, $S_3$ and $S_4$ is also used as a wheel speed sensor for an anti-lock brake system (ABS) which independently controls each of the brakes $B_1$, $B_2$, $B_3$ and $B_4$. Further, in a steering column connected to a steering wheel 59 for operating the vehicle, there is provided a steering angular sensor $S_5$ for detecting an operated steering angle $\theta$ of the steering wheel 59.

Next, a the electrical control circuit 50 for controlling the torque distribution unit 20 will be described with reference to FIG. 2. To electrical control circuit 50, there is inputted each of signals from the speed sensors $S_1$, $S_2$, $S_3$ and $S_4$, and from the steering angular sensor $S_5$. The electrical control circuit 50 is composed of an input/output circuit 58, a CPU 52 for executing a variety of calculation and control, a ROM 54 in which control programs are memorized, and a RAM 56 used as work areas of the CPU 52. In such a construction, a result of calculation in the CPU 52, as an output signal, is transferred to the torque distribution unit 20 through the input/output circuit 58.

Next, detecting operations of a tight-corner braking phenomenon and slip state in the electrical control circuit 50, and control operations of the torque distribution unit 20 will be described with reference to FIG. 4. In first step 510, into the electrical control unit 50, there is inputted a signal from each of the, sensors, i.e., wheel speed (angular velocity) $\omega_1$, $\omega_2$, $\omega_3$ and $\omega_4$ of the front wheels $RT_1$ and $RT_2$ and the rear wheels $RT_3$ and $RT_4$ from the wheel speed sensors $S_1$, $S_2$, $S_3$ and $S_4$, and the operated steering angle $\theta$ from the steering angular sensor $S_5$.

In subsequent step S20, it is judged which of the driving wheels ($RT_1$, $RT_2$) is an inner wheel. This judgment (so-called "inner-wheel judgment" hereinafter) will be explained with reference to FIG. 3. In a case that the detected wheel speed $\omega_3$ of the left driven wheel $RT_3$ is smaller than the detected wheel speed $\omega_4$ of the right driven wheel $RT_4$, it is judged that the vehicle turns left. Consequently, the inner wheel is judged to be the left driven wheel $RT_3$ in which the wheel speed $\omega_3$ is detected. Reversely, in a case that the detected wheel speed $\omega_4$ of the right driven wheel $RT_4$ is smaller than the detected wheel speed $\omega_3$ of the left driven wheel $RT_3$, it is judged that the vehicle turns right. As a result, the inner wheel is judged to be the right driven wheel $RT_4$ in which the wheel speed $\omega_4$ is detected.

Next step S30 and subsequent steps thereto will be explained in a case that the vehicle is judged to be left-turning in step S20.

In step S30, it is judged whether the tight-corner braking phenomenon happens or not. Namely, it is judged that the tight-corner braking phenomenon does not happen when the operated (detected) steering angle $\theta$ is smaller than a preset steering angle $\theta_1$ where the tight-corner braking phenomenon happens, and then the control operation moves to step S70. In step S70, there is executed a normal control operation for giving a large drive force to the driven (rear) wheels by increasing an engagement force in the clutch plates 19 of the torque distribution unit 20.

Concerning the formal control operation, it is so controlled to adjust the engagement force in the clutch plates 19 of the torque distribution unit 20 in correspondence with the detected wheel speed. When the detected wheel speed is small, the wheels is facilitated to slip, so that it is so controlled to give large drive force to the driven wheels by increasing the engagement force in the clutch plates 19 of the torque distribution unit 20. As a result, the slip state can be prevented. On the other hand, the engagement force in the clutch plates 19 of the torque distribution unit 20 is decreased as the detected wheel speed becomes large. Thus control operation is referred to as the normal control operation in step S70. Subsequently, when the operated (detected) steering angle θ is equal to or larger than the preset steering angle $\theta_1$, it is judged in step S30 that the tight-corner braking phenomenon happens, the control operation advances to next step S40.

In step S40, it is judged whether an inner slip state happens or not. Namely, it is judged whether the detected wheel speed $\omega_1$ of the inner driving wheel $RT_1$ is or not larger than the detected wheel speed $\omega_2$ of the outer driving wheel $RT_1$. When it is judged that the inner slip state happens ("NO" in step S40), the control operation is skipped to step S70 to execute the normal control operation while, when it is judged that the detected wheel speed $\omega_1$ of the inner driving wheel is equal to or smaller than the detected wheel speed $\omega_2$ of the outer driving wheel ("YES" in step S40), the control operation is advanced to subsequent step S50.

In step S50, it is judged whether an outer slip state happens or not. This judgment will be explained with reference to FIG. 3. In the figure, a radius of the each wheel is presented as "r", and turning radii of the wheels $RT_1$, $RT_2$, $RT_3$ and $RT_4$ are respectively represented as "$R_1$", "$R_2$", "$R_3$" and "$R_4$." Further, a turning angular speed (velocity) of the vehicle is represented as "ω", a front tread between the inner front wheel $RT_1$ and outer front wheel $RT_2$ and a rear tread between the inner rear wheel $RT_3$ and outer rear wheel $RT_4$ are respectively represented as "$L_f$" and "$L_r$." Moreover, a wheelbase between the driving and driven wheels is represented as "L." Herein, in a condition that each of the wheels $RT_1$, $RT_2$, $RT_3$ and $RT_4$ do not slip, the turning speed relationship is described with following expressions (1)–(4):

$$R_1 \cdot \omega = r \cdot \omega_1 \quad (1)$$

$$R_2 \cdot \omega = r \cdot \omega_2 \quad (2)$$

$$R_3 \cdot \omega = r \cdot \omega_3 \quad (3)$$

$$R_4 \cdot \omega = r \cdot \omega_4 \quad (4)$$

Expression (5) is established based upon these expressions (1)–(4).

$$R_1/\omega_1 = R_2/\omega_2 = R_3/\omega_3 = R_4/\omega_4 \quad (5)$$

In this situation, the difference between the front tread $L_f$ and the rear tread $L_r$ is extremely small, so that expressions (6) and (7) are derived in which $L_f \approx L_r$ is premised.

$$R_1^2 = R_3^2 + L^2 \quad (6)$$

$$R_2^2 = R_4^2 + L^2 \quad (7)$$

Herein, expression (8) is derived by subtracting expression (7) from expression (6).

$$R_1^2 - R_2^2 = R_3^2 - R_4^2 \quad (8)$$

Where the wheel speed (angular velocity) of the outer driving wheel calculated by expressions (5) and (8) is represented as "$\omega_{2_1}^2$."

$$\omega_{2_1}^2 = \omega_4^2 + \omega_1^2 - \omega_3^2 \quad (9)$$

From thus-derived relationship, when the detected wheel speed $\omega_2^2$ of the outer driving wheel is larger than the calculated wheel speed $\omega_{2_1}^2$ thereof ("No" is judged in step S50), it is judged that the outer wheel slip state happens, and then the control operation advances to step S70. In step S70, the normal control operation is executed, so that the slip state can be prevented. Further, when the detected wheel speed $\omega_2^2$ of the outer driving wheel is equal to or smaller than the calculated wheel speed $\omega_{2_1}^2$ thereof ("YES" is judged in step S50), it is judged that the tight-corner braking phenomenon happens, the control operation advances to step S60. In step S60, the tight-corner braking phenomenon can be prevented by decreasing the engagement force in the clutch plates 19 of the torque distribution unit 20.

Figure 4:
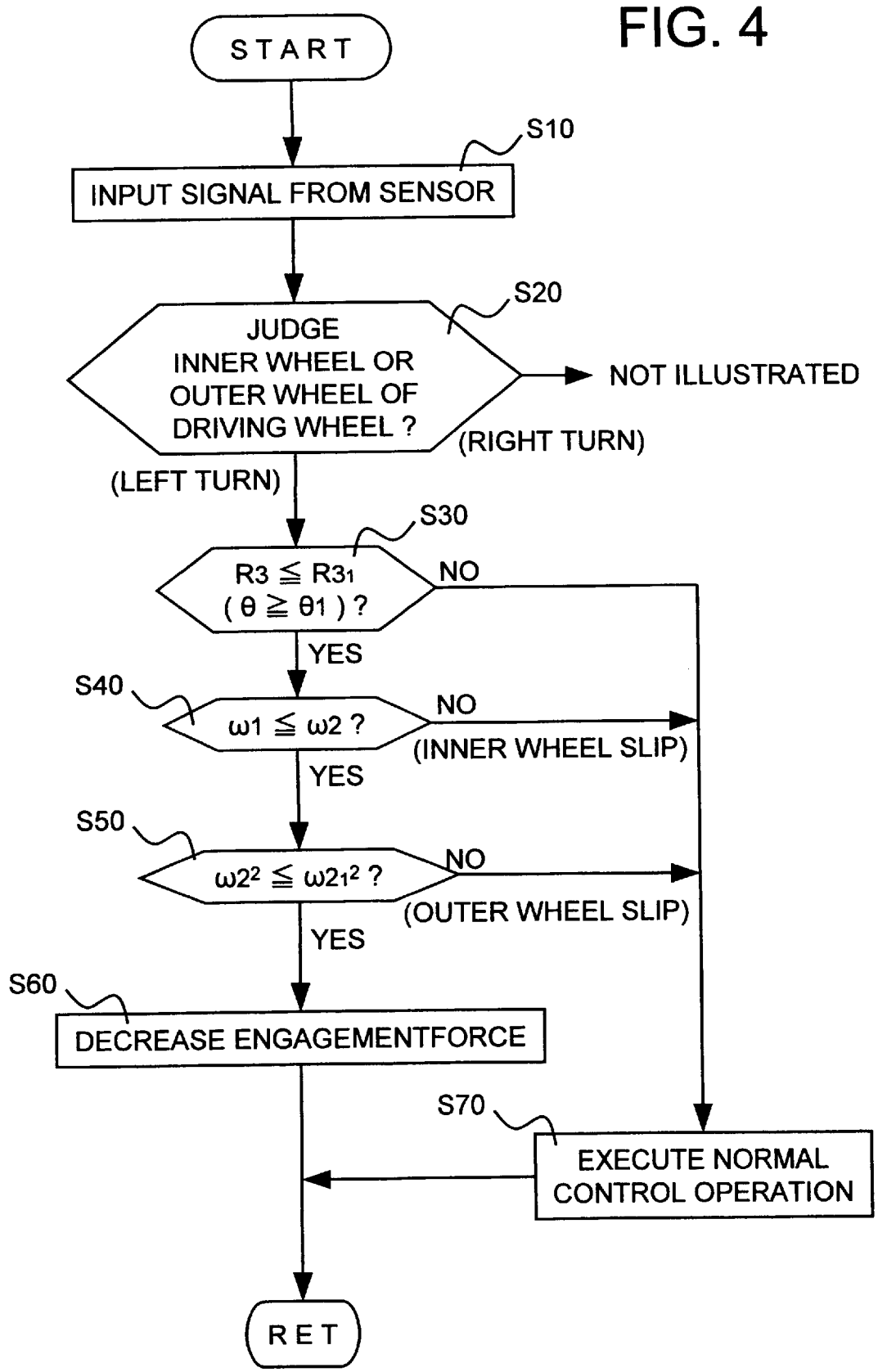
FIG. 4 is a flowchart showing a control operation according to the first embodiment of the present invention.

Besides, in the judgment whether the tight-corner braking phenomenon happens or not in the aforementioned step S30 of FIG. 4, it is judged based upon the detected steering angle θ from the steering angular sensor $S_5$. However, it is also judged by using the turning radius calculated from the wheel speed, as will be explained hereinafter The turning radius $R_4$ of the outer rear wheel $RT_4$ is derived by expression (10) with addition of the rear tread $L_r$ to the turning radius $R_3$ of the inner rear wheel $RT_3$.

$$R_4 = R_3 + L_r \quad (10)$$

Herein, the turning radius $R_3$ of the inner rear wheel $RT_3$ can be calculated by following expression (11) with expressions (5) and (10).

$$R_3 = L_r/((\omega_4/\omega_3)-1) \quad (11)$$

Based upon this relationship, it is judged that the tight-corner braking phenomenon does not happen when the tuning radius $R_3$ of the inner rear wheel $RT_3$ exceeds a preset turning radius $R_{31}$ in which the tight-corner braking phenomenon happens. Thereafter, the control operation advances to step S70 and then, the normal control operation is executed. On the other hand, when the turning radius $R_3$ of the inner rear wheel $RT_3$ is equal to or smaller than the preset turning radius $R_{31}$, it is judged that the tight-corner braking phenomenon happens, so that the control operation moves to step S40, Thus, if the generation of the tight-corner braking phenomenon is judged based upon the turning radius $R_3$ of the inner rear wheel $RT_3$, the steering angular sensor $S_5$ can be eliminated.

The above description is of that it is judged that the vehicle turns left in step S20. In a case that it is judged that the vehicle turns right in step S20, the control operation following step S30 is similarly explained (flowchart itself is omitted in FIG. 4) by substituting as that the wheel speeds of the inner driving wheel is $\omega_1$, the wheel speed of the outer driving wheel is $\omega_2$, the wheel speed of the inner driven wheel is $\omega_3$, and the wheel speed of the outer driven wheel is $\omega_4$.

According to the aforementioned first embodiment of the present invention, in a front wheel drive base four-wheel drive vehicle, the generation of the tight-corner braking phenomenon is judged in step S30 of FIG. 4. In such a situation, the wheel speed of the driven wheel that does not facilitate to slip relative to the driving wheel is used for judgment, so that the generation of the tight-corner braking phenomenon can be precisely judged.

[Second Embodiment]

Next, the second embodiment according to the present invention will be described hereinafter with reference to FIG. 5 In this second embodiment, steps S20, S30 and S50 of FIG. 4 are substituted to steps S120, S130 and S150 of FIG. 5, in which the difference relative to the first embodiment is of using a detected steering angle for control operation. Therefore, the control operations of steps S120, S130 and S150 different from the first embodiment will be mainly described in the second embodiment.

In step S120, it is judged which of the driving wheels is an inner wheel. Namely, this inner-wheel judgment is carried out based upon a detected steering angle θ from the steering angle sensor. This judgment may be executed based upon the detected wheel speed of the driven wheel, as described in the first embodiment shown in step S20 of FIG. 4

Next, the control operation of step S130 and subsequent steps thereto will be described hereinafter in a case that it is judged that the vehicle turns left in step S120.

In step S130, it is judged whether the tight-corner braking phenomenon happens or not, i.e., it is judged that the tight-corner braking phenomenon does not happen when the steering operated angle θ is smaller than a preset angle $θ_1$ where the tight-corner braking phenomenon happens, and then the control operation moves to step S70 to execute the normal control operation. In contrast, when the detected steering angle θ is equal to or larger than the preset angle $θ_1$, it is judged that the tight-corner braking phenomenon happens. Subsequently, the control operation advances to step S140 and however, the control operation of step S140 is similar to that of step S40 of the first embodiment, so that its explanation is omitted. Next, the control operation of step S150 will be described hereinafter.

In step S150, it is judged whether an outer-wheel slip state happens or not. This judgment will be explained with reference to FIG. 3. In a case that a wheel speed of the outer driving wheel $RT_2$ is presented as "$ω_2$", an average wheel speed $ω_5$ between the wheel speeds $ω_3$ and $ω_4$ of the inner and outer driven wheels $RT_3$ and $RT_4$ is presented by expression (12).

$$ω_5=(ω_3+ω_4)/2 \quad (12)$$

Where a steering gear ratio is presented as "N," and where an actual steered angle is presented as "δ," the relationship between the steering gear ratio N, steering operated angle θ and actual steered angle δ is presented by "δ=θ/N." The wheel speed $ω_{2_2}$ of the driving wheel calculated due to this relationship is derived by expression (13).

$$ω_{2_2}=ω_5/\cos δ=(ω_3+ω_4)/(2·\cos δ) \quad (13)$$

In the aforementioned expression (13), it is not taken account into such that an influence of a term corresponding to the front tread $L_f/2$ is small and however, more precise judgment can be established by taking account into a calculation in the influence of a term corresponding to the front tread $L_f/2$.

Due to these relationships, when the detected wheel speed $ω_2$ of the outer driving wheel is larger than the calculated wheel speed $ω_{2_2}$ thereof ("NO" is judged in step S150), it is judged that the outer-wheel slip state happens, and then the control operation moves to step S70. The formal control operation is executed in step S70, so that the outer-wheel slip state can be prevented. Reversely, when the detected wheel speed $ω_2$ of the outer driving wheel is equal to or smaller than the calculated wheel speed $ω_{2_2}$ thereof ("YES" is judged in step S150), it is judged that the tight-corner braking phenomenon happens and then, the control operation moves to step S60. In step S60, the generation of the tight-corner braking phenomenon can be prevented by decreasing the engagement force in the clutch plates 19 of the torque distribution unit 20.

The aforementioned control operation is explained about a case that it is judged that the vehicle turns left in step S120. In a case that it is judged that the vehicle turns right in step S120, the control operation is omitted in FIG. 5 and however, that of step S130 and subsequent steps thereto is similarly explained by respectively substituting the wheel speeds of the inner driving wheel, outer driving wheel, inner driven wheel and outer driven wheel to $ω_1$, $ω_2$, $ω_3$ and $ω_4$.

Figure 5:
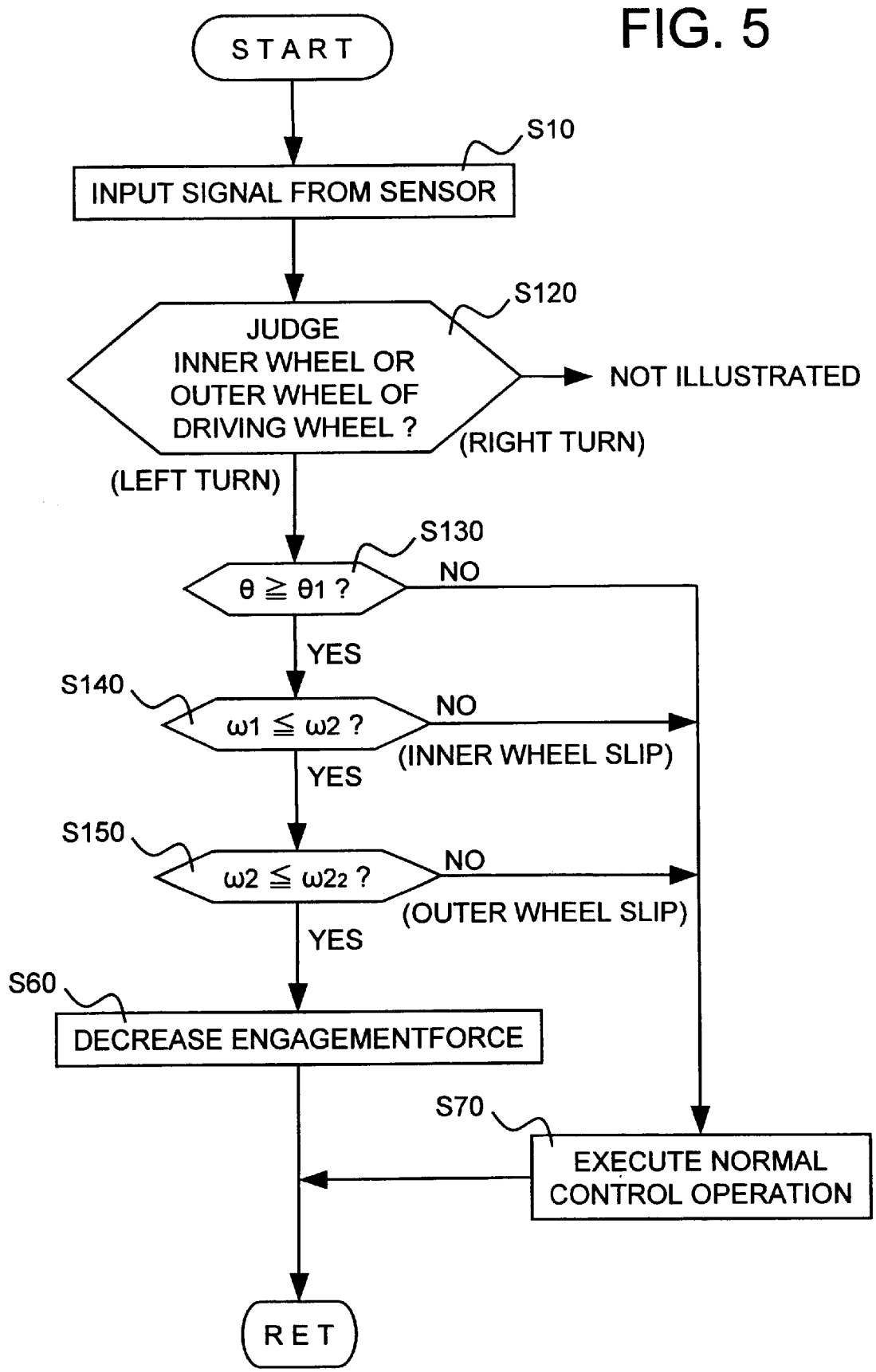
FIG. 5 is a flowchart showing a control operation according to the second embodiment of the present invention.

According to the aforementioned second embodiment, in a front-wheel-drive base four-wheel-drive vehicle, the judgment operation for which is an inner/outer driving wheel shown in step S120 of FIG. 5 is executed by the detected steering angle, so that the influence of the wheel slip state can be eliminated compared with a case that it is judged by the wheel speed. Therefore, the judgment of the inner/outer driving state can precisely carried out in no connection with the slip state of the wheel. Further, in the outer wheel slip judgment shown in step S150 of FIG. 5, it is judged due to the wheel speed of the driven wheel that does not facilitate to slip relative to the driving wheel and therefore, the outer wheel slip judgment can be executed precisely.

[Third Embodiment]

Next, a torque distribution unit of a four-wheel-drive vehicle according to the third embodiment of the present invention will be will be described hereinafter with reference to the drawings. In the third embodiment, FIG. 1 in the first and second embodiments is substituted to FIG. 6, and steps S20–S50 therein are substituted to steps S220–S250 of FIG. 7. The difference relative to the fist embodiment is to change the vehicle drive type from a front-wheel-drive base to a rear-wheel-drive base. Therefore, the construction and control operation for the third embodiment will be mainly described with reference to FIG. 6 and steps S220–S250 of FIG. 7.

Figure 6:
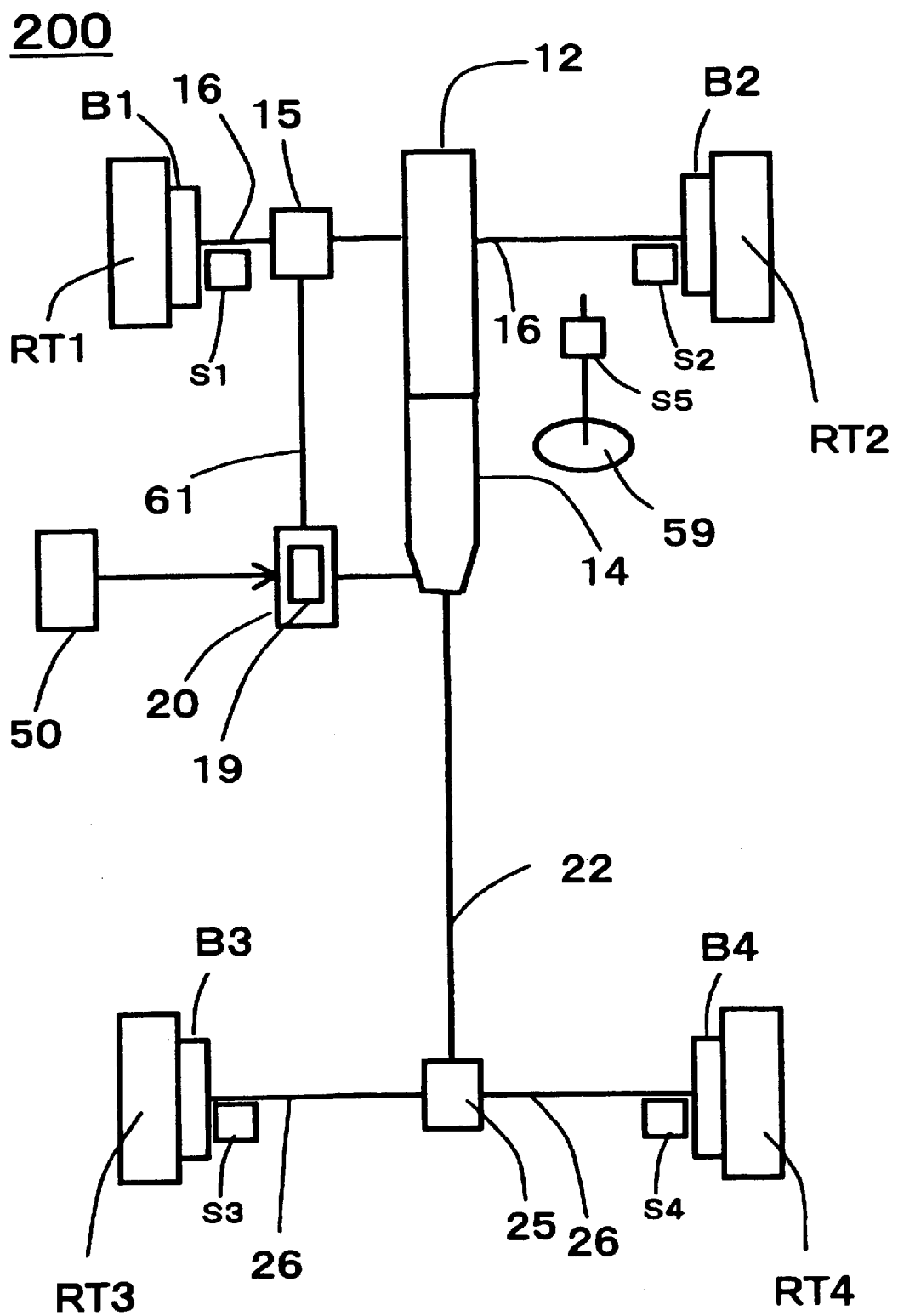
FIG. 6 is a diagram schematically showing the structure of a four-wheel-drive vehicle which is provided with a drive-force distribution controller according to third and fourth embodiments of the present invention.

FIG. 6 is a diagram schematically showing the structure of a four-wheel-drive vehicle which is provided with a torque distribution unit according to the third and fourth embodiments of the present invention. A trans axle 14 is of unitedly providing a transmission and a transfer, in which a drive force (drive power) generated by an engine 12 is transmitted from the trans axle 14 to axle shafts 26 via a first propeller shaft 22 and a rear differential 25 to drive left and right rear wheels $RT_3$ and $RT_4$. With this transmission, the drive force is transmitted to a torque distribution unit 20 to which a second propeller shaft 61. When the trans axle 14 is torque-transmissibly connected to the second propeller shaft 61 by the torque distribution unit 20, the drive force is transmitted from a front differential 15 to axle shafts 16 to drive left and right front wheels $RT_1$ and $RT_2$.

The torque distribution unit 20 is of being disposed between the trans axle 14 and the second propeller shaft 61, and is composed of clutch plates 19 for transmitting a torque (drive force) from the trans axle 14 to the second propeller shaft 61, and of a pressing mechanism (not illustrated) for pressing the clutch plates 19. When a command signal from an electrical control circuit 50 is given to the pressing mechanism, a pressing force corresponding to the command signal acts on the clutch plates 19. In a case that it is so controlled to increase a torque distribution from the trans axle 14 to the second propeller shaft 61 due to the command signal, the clutch plates 19 are directly connected thereby, so that the torque from the trans axle 14 can be directly transmitted to the second propeller shaft 51, for example. In contrast, when it is so controlled to restrict the torque distribution from the trans axle 14 to the second propeller shaft 61, the command signal is also restricted to the pressing mechanism, so that the pressing force by the pressing mechanism does not act on the clutch plates 19. Therefore, the clutch plates 19 are separated from each other, so that the torque from the trans axle 14 is not transmitted to the second propeller shaft 61. Thus, it is so constructed that the transmissible torque supplied from the trans axle 14 to the second propeller shaft 61 can be adjusted by changing an engagement force of the clutch plates 19 in correspondence with a magnitude of the command signal.

On the driven wheels $RT_1$ and $RT_2$ and the driving wheels $RT_3$ and $RT_4$, there are respectively provided brakes $B_1$, $B_2$, $B_3$ and $B_4$, and wheel speed sensors $S_1$, $S_2$, $S_3$ and $S_4$ for detecting each of wheel speeds (velocity). Besides, each of the speed sensors $S_1$, $S_2$, $S_3$ and $S_4$ also is used for a wheel speed sensor for an anti-lock brake system (ABS) which independently controls each of the brakes $B_1$, $B_2$, $B_3$ and $B_4$. Further, in a steering column connected to a steering wheel 59 for operating the vehicle, there is provided a steering angular sensor $S_5$ for detecting an operated steering angle $\theta$ of the steering wheel 59.

Figure 2:
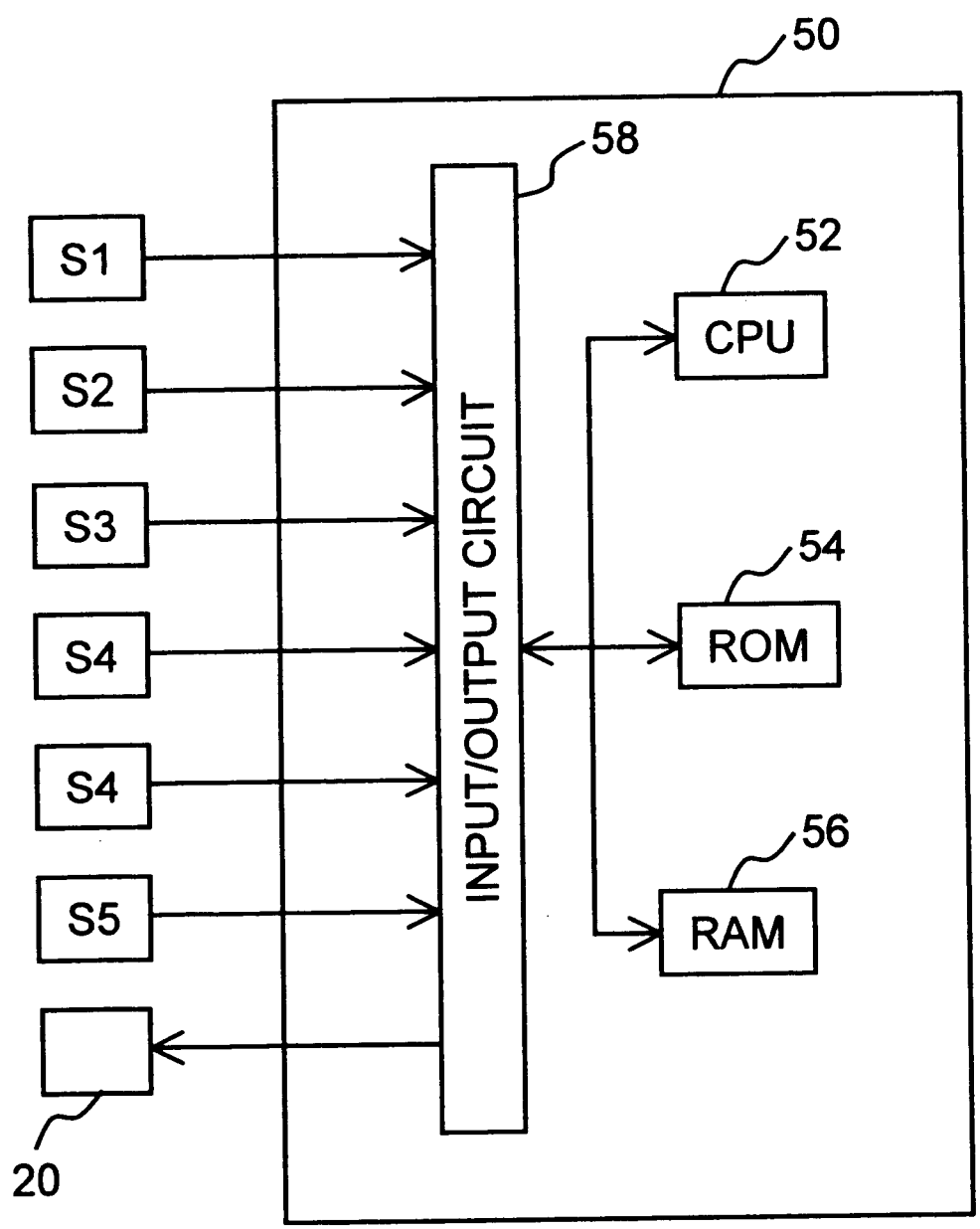
FIG. 2 shows a block diagram of an electrical control circuit according to the present invention.
Figure 7:
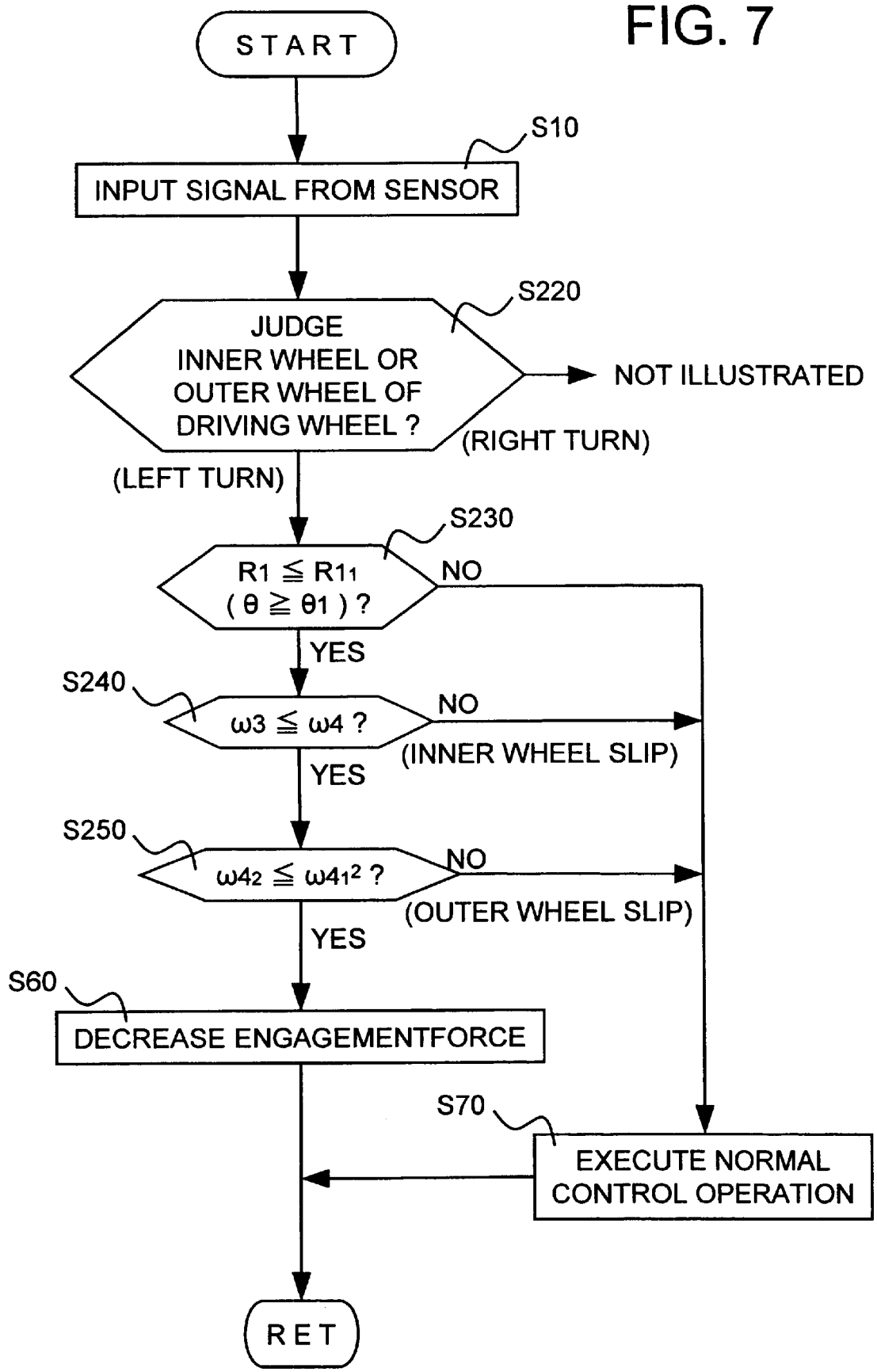
FIG. 7 is a flowchart showing a control operation according to the third embodiment of the present invention.

Herein, a control circuit used in this embodiment is same as that in the first and second embodiments (shown in FIG. 2). Further, a control operation in step S10 of FIG. 7 is also same as that in the first and second embodiments (shown in FIGS. 4 and 5).

Next, the control operations in subsequent steps S220–S250 in FIG. 7 will be described hereinafter for explanation.

In step S220, it is judged which of the driving wheels is an inner wheel or an outer wheel. This inner/outer-wheel judgment will be explained with reference to FIG. 3. In a case that a detected wheel speed $\omega_1$ of the left driven wheel $RT_1$ is smaller than the detected wheel speed $\omega_2$ of the right driven wheel $RT_2$, it is judged that the vehicle turns left. Consequently, the inner wheel is judged to be the left driven wheel $RT_1$ in which the wheel speed $\omega_1$ is detected. Reversely, in a case that the detected wheel speed $\omega_2$ of the right driven wheel $RT_2$ is smaller than the detected wheel speed $\omega_1$ of the left driven wheel $RT_1$, it is judged that the vehicle turns right. As a result, the inner wheel is judged to be the right driven wheel $RT_2$ in which the wheel speed $\omega_2$ is detected.

Next, the control operation of step, S230 and subsequent steps thereto will be explained, in which it is judged in step S220 that the vehicle turns left.

In step S230, it is judged whether a tight-corner braking phenomenon happens or not. In this judgment, it is judged that the tight-corner braking phenomenon does not happen when the operated steering angle $\theta$ is smaller than a predetermined angle $\theta_1$ where the tight-corner braking phenomenon happens, and then the control operation moves to step S270 in which the formal control is executed. In contrast when the operated steering angle $\theta$ is equal to or larger than the predetermined angle $\theta_1$, it is judged that the tight-corner braking phenomenon happens, and then the control operation moves to next step S20.

In step S240, the inner wheel judgment is executed, i.e., it is judged whether the detected wheel speed $\omega_3$ of the inner driving wheel is larger than the detected wheel speed $\omega_4$ of the driving outer wheel. When "NO" is judged in step S240, it judged to be the inner-wheel slip state, the control operation is skipped to step S70. In step S70, the normal control operation is executed, so that the slip state of the inner wheel can be prevented. Reversely, when it is judged that the detected wheel speed $\omega_3$ of the inner driving wheel is equal to or smaller than the detected wheel speed $\omega_4$ of the outer driving wheel ("YES" in step S240), the control operation is advanced to next step S250.

In step S250, it is judged whether the outer-wheel slip state happens or not. This judgment will be explained with reference to FIG. 3. However, the relationship between the turning radii ($R_1$, $R_2$, $R_3$, $R_4$), wheel speeds ($\omega_1$, $\omega_2$, $\omega_3$, $\omega_4$) and wheelbase (L) is same as that in the first embodiment, the explanation is omitted in calculation of expression (1)–(8).

Herein, it is assumed that the wheel speed (angular velocity) of the outer driving wheel calculated by expressions (5) and (8) is represented as "$\omega_{4_1}^2$", it is derived by expression (14).

$$\omega_{4_1}^2 = \omega_2^2 + \omega_3^2 - \omega_1^2 \tag{14}$$

From thus-derived relationship, when the detected wheel (angular) speed $\omega_4^2$ of the outer driving wheel is larger than the calculated wheel (angular) speed $\omega_{4_1}^2$ thereof ("NO" is judged in step S250), it is judged that the outer-wheel slip state happens, and then the control operation advances to step S70. In step S70, the normal control operation is executed, so that the slip state can be prevented. Further, when the detected wheel (angular) speed $\omega_4^2$ of the outer driving wheel is equal to or smaller and the calculated wheel (angular) speed $\omega_{4_1}^2$ thereof ("YES" is judged in step S250), it is judged that the tight-corner braking phenomenon happens, the control operation advances to step S260. In step S60, the tight-corner braking phenomenon can be prevented by decreasing the engagement force in the clutch plates 19 of the torque distribution unit 20.

Besides, in the judgment whether the tight-corner braking phenomenon happens or not in the aforementioned step S230 of FIG. 7, it is judged based upon the detected steering operated angle $\theta$ from the steering angular sensor $S_5$. However, it is also judged by using the turning radius calculated from the wheel speed, as will be explained hereinafter.

Figure 3:
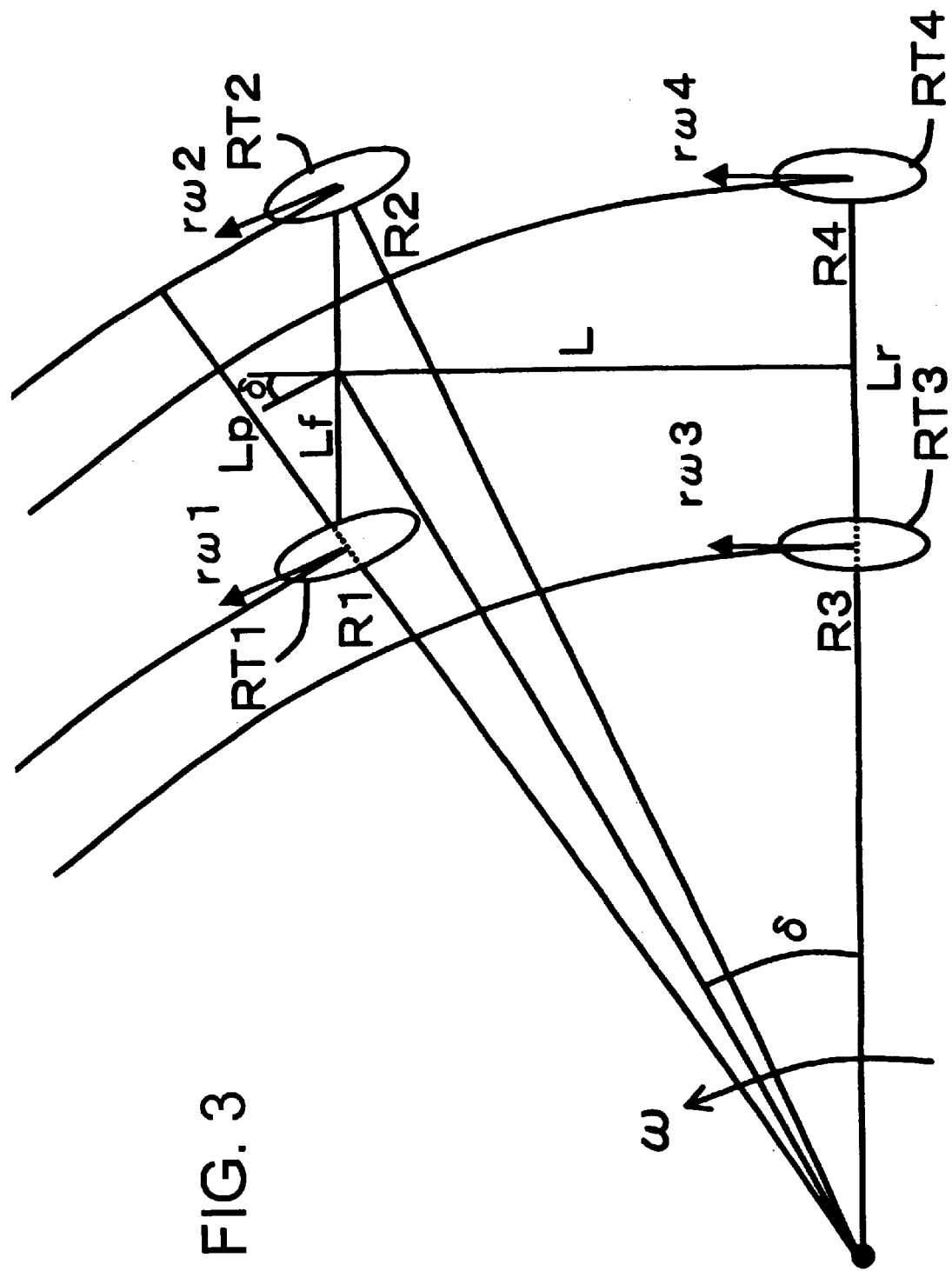
FIG. 3 is an explanatory view a calculation of a turning radius when the vehicle turns left, according to the present invention.

As shown in FIG. 3, the front tread between the inner and outer front wheels $RT_1$ and $RT_2$, and the rear tread between the inner and outer wheels $RT_3$ and $RT_4$ are respectively represented as "$L_f$" and "$L_r$." Further, in a case that an equivalent front tread between the inner and outer front wheels $RT_1$ and $RT_2$, is presented as "$L_p$", expression (15) is derived based upon the turning radius of the front wheel and wheel speeds.

$$R_1 \cdot r \omega_1 = R_1 + L_p \cdot r \omega_2 \tag{15}$$

Herein, "$L_p \approx L_f$" is established so that expression (16) is derived from expression (15).

$$R_1 = L_f \cdot r \omega_1 / (r \omega_2 - r \omega_1) \tag{16}$$

Based upon thus-derived relationship, when the calculated turning radius $R_1$ of the inner front wheel $RT_1$ exceeds a predetermined turning radius $R_{1_1}$ where the tight-corner braking phenomenon happens, it is judged in step S270 that the tight-corner braking phenomenon does not happen, and then the control operation moves to step S70 to execute the normal control operation. Reversely, when the calculated turning radius $R_1$ of the inner front wheel $RT_1$ exceeds a predetermined turning radius $R_{1_1}$, it is judged in the step that the tight-corner braking phenomenon happens, and then the control operation moves to step S240.

Thus, the generation of the tight-corner braking phenomenon is judged by the calculated turning radius $R_1$ of the inner front wheel $RT_1$, so that it is possible to eliminate the steering angle sensor $S_5$.

The above description is of that it is judged that the vehicle turns left in step S220. In a case that it is judged that the vehicle turns right in step S220, the control operation following step S230 is similarly explained (flowchart itself is omitted in FIG. 7) by substituting as that the wheel speeds of the inner driven wheel is $\omega_1$, the wheel speed of the outer driven wheel is $\omega_2$, the wheel speed of the inner driving wheel is $\omega_3$, and the wheel speed of the outer driving wheel is $\omega_4$.

According to the aforementioned third embodiment, in a rear-wheel-drive base four-wheel-drive vehicle, the generation of the tight-corner braking phenomenon is judged in step S230 of FIG. 7. In such a situation, the wheel speed of the driven wheel that does not facilitate to slip relative to the driving wheel is used for judgment, so that the generation of the tight-corner braking phenomenon can be precisely judged.

[Fourth Embodiment]

Figure 8:
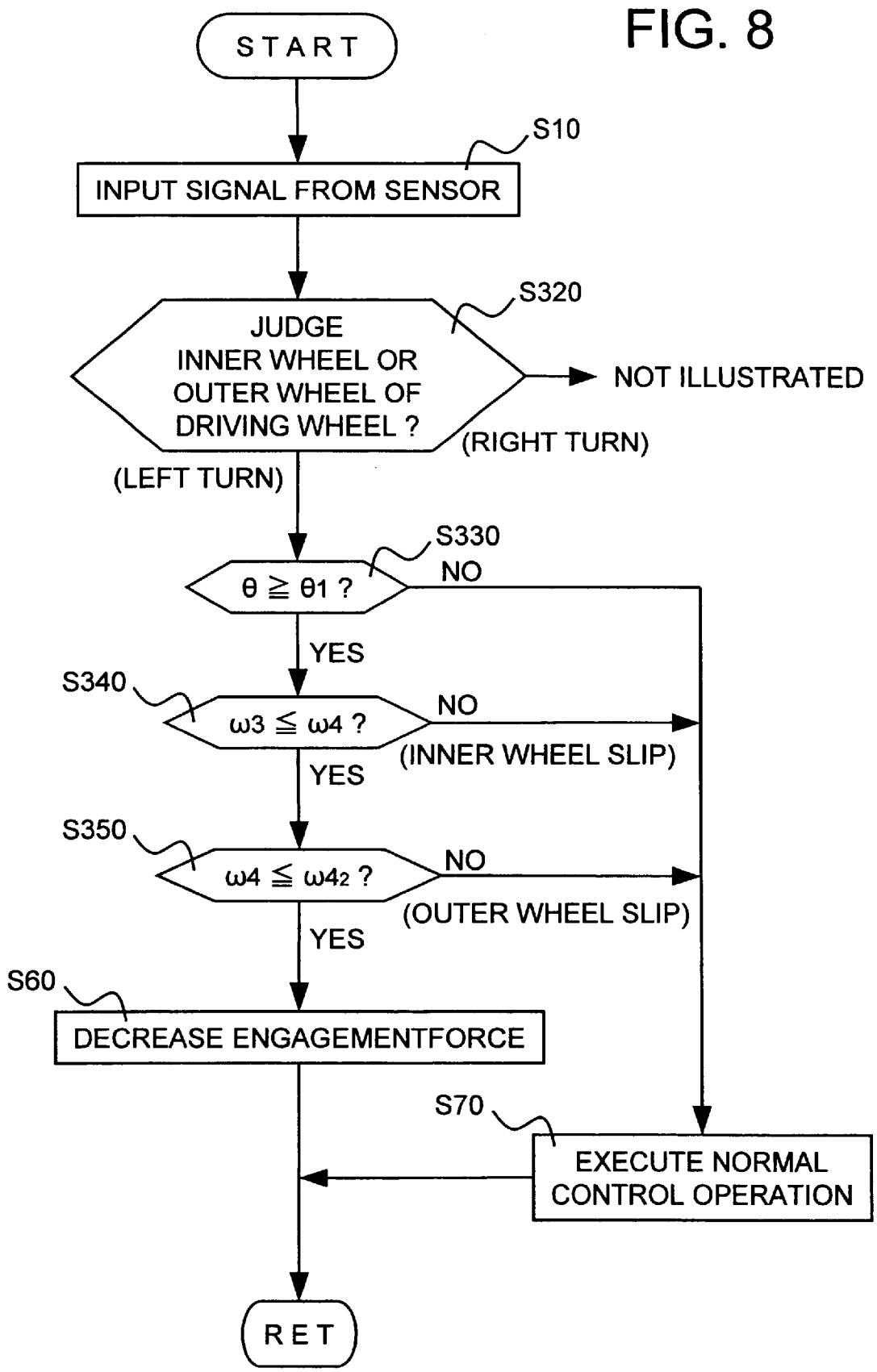
FIG. 8 is a flowchart showing a control operation according to the fourth embodiment of the present invention.

Next, a fourth embodiment according to the present invention will be described hereinafter with reference to FIG. 8. In this fourth embodiment, steps S220, S230 and S250 shown in FIG. 7 are substituted to steps S320, S330 and S350 shown in FIG. 8, in which the difference relative to the embodiment is of using a detected steering operated angle for control operation. Therefore, the control operations of steps S320, S330 and S350 in FIG. 8 different from the third embodiment will be mainly described in the second embodiment.

In step S320, it is judged which of the driving wheels is an inner or outer wheel. Namely, the judgment of the inner/outer wheel is carried out based upon a detected steering operated angle θ from the steering angle sensor. This judgment, as described in the third embodiment shown in step S220 of FIG. 7, may be executed based upon the detected wheel speed of the driven wheel.

Next, the control operation of step S130 and subsequent steps thereto will be described hereinafter in a case that it is judged that the vehicle turns left in step S320.

In step S330, it is judged whether the tight-corner braking phenomenon happens or not. In this judgment, it is judged that the tight-corner braking phenomenon does not happen when the steering operated angle θ is smaller than a predetermined angle $θ_1$ where the tight-corner braking phenomenon happens, and then the control operation moves to step S70 in which the normal control operation is executed. In contrast, when the steering operated angle θ is equal to or larger than the predetermined angle $θ_1$, it is judged that the tight-corner braking phenomenon happens. Subsequently, the control operation advances to step S340 and however, the control operation of step S340 is similar to that of step S240 of the third embodiment, so that its explanation is omitted. Next, the control operation of step S350 will be described hereinafter.

In step S350, it is judged whether an outer-wheel slip state happens or not. In a case that a wheel speed of the outer driving wheel $RT_4$ is presented as "$ω_4$", an average wheel speed $ω_6$ between the wheel speeds $ω_1$ and $ω_2$ of the inner and outer driven wheels $RT_1$ and $RT_2$ is presented by expression (17).

$$ω_6=(ω_1+ω_2)/2 \quad (17)$$

Where a steering gear ratio, is presented as "N," and where an actual steered angle is presented as "δ", the relationship between the steering gear ratio N, steering operated angle θ and actual steered angle δ is presented by "δ=θN." The wheel speed $ω_{4_2}$ of the driving wheel calculated due to this relationship is presented by expression (18).

$$ω_{4_2}=ω_6·\cos δ=(ω_1+ω_2) \cos δ/2 \quad (18)$$

Due to these relationships, when the detected wheel speed $ω_4$ of the outer driving wheel is larger than the calculated wheel speed $ω_{4_2}$ thereof ("NO" is judged in step S350), it is judged to be the outer wheel slip state, and then the control operation moves to step S70. The formal control operation is executed in step S70, so that the slip state can be prevented. Reversely, when the detected wheel speed $ω_4$ of the outer driving wheel is equal to or smaller than the calculated wheel speed $ω_{4_2}$ thereof ("YES" is judged in step S350), it is judged that the tight-corner braking phenomenon happens and then, the control operation moves to step S60. In step S60, the generation of the tight-corner braking phenomenon can be prevented by decreasing the engagement force in the clutch plates 19 of the torque distribution unit 20.

The aforementioned control operation is explained about a case that it is judged that the vehicle turns left in step S320. In a case that it is judged that the vehicle turns right in step S320, the control operation is omitted in FIG. 5 and however, that of step S330 and the following step thereto is similarly explained by respectively substituting the wheel speeds of the inner driven wheel, outer driven wheel, inner driving wheel and outer driving wheel to $ω_1$, $ω_2$, $ω_3$ and $ω_4$.

According to the aforementioned fourth embodiment, in a rear-wheel-drive base four-wheel-drive vehicle, the judgment operation for which is an inner/outer driving wheel shown in step S120 of FIG. 5 is executed by the steering operated angle, the influence of the wheel slip state can be eliminated compared with a case that it is judged by the wheel speed. Therefore, the judgment of the inner/outer driving state can precisely carried out in no connection with the slip state of the wheel. Further, in the outer wheel slip judgment shown in step S350 of FIG. 8, it is judged due to the wheel speed of the driven wheel that does not facilitate to slip relative to the driving wheel and therefore, the outer-wheel slip judgment can be executed precisely.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive-force distribution controller for a four-wheel-drive vehicle having a torque distribution unit configured to distribute an output torque transmitted from a prime motor to a first set of wheels to a second set of wheels, the drive-force distribution controller compnsing:

first judging means for judging which of the first set of wheels is an inner wheel with respect to a turning of the four-wheel-drive vehicle;

second judging means for judging whether the turning of the four-wheel-drive vehicle is a tight turn;

third judging means for judging whether the inner wheel is slipping;

fourth judging means for judging whether an outer wheel of the first set of wheels is slipping; and controlling means for controlling the torque distribution unit, wherein the second judging means judges that the four-wheel-drive vehicle is engaged in a tight turn if the turning has a turning radius smaller than a predetermined value, and the controlling means decreases the output torque to the second set of wheels if the second judging means judges that the four-wheel-drive vehicle is engaged in a tight turn and if the third and fourth judging means judge that the first set of wheels are not slipping.

2. The drive-force distribution controller according to claim 1, wherein the controlling means controls the output torque to the second set of wheels in response to wheel speeds of the first and second sets of wheels at least one of if the second judging means judges that the turning of the four-wheel-drive vehicle is not a tight turn, if the third judging means judges that the inner wheel is slipping, and if the fourth judging means judges that the outer wheel is slipping.

3. The drive-force distribution controller according to claim 1, further comprising a plurality of wheel speed sensors positioned to detect wheel speeds of the first and second sets of wheels, respectively, wherein the third judging means judges whether the inner wheel is slipping based on the wheel speed of the inner wheel and the wheel speed of the outer wheel of the first set of wheels, the fourth judging means judges whether the outer wheel is slipping based on the wheel speed of the outer wheel and a calculated wheel speed of the outer wheel, the calculated wheel speed of the outer wheel being calculated based on the wheel speeds of the inner wheel and second set of wheels, and the fourth judging means judges that the outer wheel is slipping if the wheel speed of the outer wheel exceeds the calculated wheel speed of the outer wheel.

4. The drive-force distribution controller according to claim 3, wherein the first judging means judges which of the first set of wheels is an inner wheel with respect to the turning of the four-wheel-drive vehicle based on the wheel speeds of the second set of wheels.

5. The drive-force distribution controller according to claim 3, wherein the second judging means determines the turning radius based on the wheel speeds of the second set of wheels.

6. The drive-force distribution controller according to claim 2, further comprising:
an angular sensor positioned to detect a steering angle of a steering wheel; and
a plurality of wheel speed sensors positioned to detect wheel speeds of the first and second sets of wheels, respectively,
wherein:
the third judging means judges whether the inner wheel is slipping based on the wheel speed of the inner wheel and the wheel speed of the outer wheel of the first set of wheels;
the fourth judging means judges whether the outer wheel is slipping based on the wheel speed of the outer wheel and a calculated wheel speed of the outer wheel, the calculated wheel speed of the outer wheel being calculated based on the steering angle and the wheel speeds of the second set of wheels; and
the fourth judging means judges that the outer wheel is slipping if the wheel speed of the outer wheel exceeds the calculated wheel speed of the outer wheel.

7. The drive-force distribution controller according to claim 6, wherein the second judging means determines the turning radius based on the steering angle.

8. The drive-force distribution controller according to claim 6, wherein the first judging means judges which of the first set of wheels is an inner wheel with respect to the turning of the four-wheel-drive vehicle based on the steering angle.

9. A drive-force distribution controller for a four-wheel-drive vehicle having a torque distribution unit configured to distribute an output torque transmitted from a prime motor to a first set of wheels to a second set of wheels, the drive-force distribution controller comprising:
a first judging device configured to judge which of the first set of wheels is an inner wheel with respect to a turning of the four-wheel-drive vehicle;
a second judging device configured to judge whether the turning of the four-wheel-drive vehicle is a tight turn;
a third judging device configured to judge whether the inner wheel is slipping;
a fourth judging device configured to judge whether an outer wheel of the first set of wheels is slipping; and
a controller configured to control the torque distribution unit,
wherein the second judging device is configured to judge that the four-wheel-drive vehicle is engaged in a tight turn if the turning has a turning radius smaller than a predetermined value, and the controller is configured to decrease the output torque to the second set of wheels if the second judging device judges that the four-wheel-drive vehicle is engaged in a tight turn and if the third and fourth judging devices judge that the first set of wheels are not slipping.

10. The drive-force distribution controller according to claim 9, wherein the controller is configured to control the output torque to the second set of wheels in response to wheel speeds of the first and second sets of wheels at least one of if the second judging device judges that the turning of the four-wheel-drive vehicle is not a tight turn, if the third judging device judges that the inner wheel is slipping, and if the fourth judging device judges that the outer wheel is slipping.

11. The drive-force distribution controller according to claim 9, further comprising a plurality of wheel speed sensors positioned to detect wheel speeds of the first and second sets of wheels, respectively, wherein the third judging device is configured to judge whether the inner wheel is slipping based on the wheel speed of the inner wheel and the wheel speed of the outer wheel of the first set of wheels, the fourth judging device is configured to judge whether the outer wheel is slipping based on the wheel speed of the outer wheel and a calculated wheel speed of the outer wheel, the calculate wheel speed of the outer wheel being calculated based on the wheel speeds of the inner wheel and second set of wheels, and the fourth judging device is configured to judge that the outer wheel is slipping if the wheel speed of the outer wheel exceeds the calculated wheel speed of the outer wheel.

12. The drive-force distribution controller according to claim 11, wherein the first judging device is configured to judge which of the first set of wheels is an inner wheel with respect to the turning of the four-wheel-drive vehicle based on the wheel speeds of the second set of wheels.

13. The drive-force distribution controller according to claim 11, wherein the second judging device is configured to determine the turning radius based on the wheel speeds of the second set of wheels.

14. The drive-force distribution controller according to claim 9, further comprising:
an angular sensor positioned to detect a steering angle of a steering wheel; and
a plurality of wheel speed sensors positioned to detect wheel speeds of the first and second sets of wheels, respectively,
wherein:
the third judging device is configured to judge whether the inner wheel is slipping based on the wheel speed of the inner wheel and the wheel speed of the outer wheel of the first set of wheels;

the fourth judging device is configured to judge whether the outer wheel is slipping based on the wheel speed of the outer wheel and a calculated wheel speed of the outer wheel, the calculate wheel speed of the outer wheel being calculated based on the steering angle and the wheel speeds of the second set of wheels; and the fourth judging device is configured to judge that the outer wheel is slipping if the wheel speed of the outer wheel exceeds the calculated wheel speed of the outer wheel.

15. The drive-force distribution controller according to claim 14, wherein the second judging device is configured to determine the turning radius based on the steering angle.

16. The drive-force distribution controller according to claim 14, wherein the first judging device is configured to judge which of the first set of wheels is an inner wheel with respect to the turning of the four-wheel-drive vehicle based on the steering angle.

* * * * *